United States Patent
Agarwal et al.

[11] Patent Number: 6,075,779
[45] Date of Patent: Jun. 13, 2000

[54] RANDOM ACCESS CHANNEL CONGESTION CONTROL FOR BROADCAST TELESERVICE ACKNOWLEDGMENT MESSAGES

[75] Inventors: Anjana Agarwal, Wheaton; Awinash Trimbak Talwalkar, Homewood, both of Ill.; Bulin Zhang, Branchville, N.J.

[73] Assignee: Lucent Technologies, Inc., Murry Hill, N.J.

[21] Appl. No.: 08/871,108

[22] Filed: Jun. 9, 1997

[51] Int. Cl.[7] .............................. H04B 7/212; H04B 7/00; H04J 3/02
[52] U.S. Cl. ...................... 370/337; 370/462; 455/515; 455/517; 455/430
[58] Field of Search ................................ 370/336, 337, 370/442, 445, 447, 448, 461, 462; 455/31.3, 515, 517, 516, 511, 509, 507, 434, 450, 430, 426

[56] References Cited

U.S. PATENT DOCUMENTS

| | | | |
|---|---|---|---|
| 5,353,287 | 10/1994 | Kuddes et al. | 370/85.2 |
| 5,548,586 | 8/1996 | Kito et al. | 370/60 |
| 5,598,417 | 1/1997 | Crisler et al. | 370/348 |
| 5,663,715 | 9/1997 | Godoroia | 455/31.3 |
| 5,778,316 | 7/1998 | Persson et al. | 455/515 |
| 5,797,085 | 8/1998 | Beuk et al. | 455/517 |
| 5,799,018 | 8/1998 | Kanekiyo et al. | 370/461 |
| 5,825,764 | 10/1998 | Rudolph | 455/515 |
| 5,842,125 | 11/1998 | Modzelesky et al. | 455/426 |
| 5,850,602 | 12/1998 | Tisdale et al. | 455/430 |

FOREIGN PATENT DOCUMENTS

| | | | |
|---|---|---|---|
| 0475698A2 | 9/1991 | European Pat. Off. | H04Q 7/04 |
| 0687078A2 | 6/1995 | European Pat. Off. | H04B 7/26 |
| 0767548A2 | 9/1996 | European Pat. Off. | H04B 7/26 |
| 2178271 | 7/1985 | United Kingdom | H04J 3/16 |
| 2300090 | 4/1995 | United Kingdom | H04Q 7/22 |
| WO93/21741 | 4/1993 | WIPO | H04Q 7/04 |
| WO95/19687 | 1/1994 | WIPO | H04Q 7/38 |

*Primary Examiner*—Alpus H. Hsu
*Assistant Examiner*—Afsar M Qureshi

[57] ABSTRACT

One embodiment of the present invention is a method for controlling the number of mobile-telephones transmitting acknowledgments to broadcast short messages (BSM) over a same set of random access channels at a same time. In this embodiment, the transmissions of BSM acknowledgments is controlled by the wireless communication system using random access channel restrictions and random access techniques. Specifically, the random access channel restrictions reduce collisions among acknowledging mobile-telephones and call processing mobile-telephones by allocating one or more specific random access channels over which a BSM acknowledgment can be transmitted, and the random access techniques reduce collisions among acknowledging mobile-telephones by distributing transmissions of the BSM acknowledgments over a period of time.

15 Claims, 4 Drawing Sheets

FIG. 4

| TS | 1 | 2 | 3 | 4 | 5 | 6 | 1 | 2 | 3 | 4 | 5 | 6 | 1 | 2 | 3 | 4 | 5 | 6 | 1 | 2 | 3 | 4 | 5 | 6 | 1 | 2 | 3 |
|---|---|---|---|---|---|---|---|---|---|---|---|---|---|---|---|---|---|---|---|---|---|---|---|---|---|---|---|
| SUB-CHANNEL COUNT | 0 | | | 1 | | | 2 | | | 3 | | | 4 | | | 5 | | | 6 | | | 7 | | | 8 | | |
| REVERSE SUB-CHANNEL | $R_1$ | | | $R_2$ | | | $R_3$ | | | $R_4$ | | | $R_5$ | | | $R_6$ | | | $R_1$ | | | $R_2$ | | | $R_3$ | | |

HYPERFRAME COUNT = 0

6,075,779

RANDOM ACCESS CHANNEL CONGESTION CONTROL FOR BROADCAST TELESERVICE ACKNOWLEDGMENT MESSAGES

FIELD OF THE INVENTION

The present invention relates to wireless communication systems and, in particular, to controlling channel congestion in wireless communication systems.

BACKGROUND

In time division multiple access (TDMA) wireless communication-systems based on the well-known IS-136 standard, a set of channels referred to as control channels are used for communicating control information and short messages between the wireless communication systems and mobile-telephones. The control channels typically include at least one reverse channel and one forward channel. The reverse channels and forward channels include a set of reverse sub-channels and forward sub-channels, respectively. The wireless communication systems use the forward sub-channels to transmit short messages, paging messages, etc. to the mobile-telephones. By contrast, the mobile-telephones use the reverse sub-channels to transmit call processing related messages (e.g., call origination and paging response messages), acknowledgments to short messages, etc. to the wireless communication systems. Note that the reverse sub-channels are also referred to herein collectively as Random Access Channels (RACH).

Specifically, the short messages (SM) are transmitted by the wireless communication systems to a particular mobile-telephone on a set of forward sub-channels referred to herein as Short Messaging Service Channels (SMSCH). A short message can be one of two types: (1) an informative message, such as a numeric page; or (2) a request for the mobile-telephone to respond with an acknowledgment. If the short message is a request, the mobile-telephone can respond to the wireless communication system with a SM acknowledgment on the RACH. Typically, the ratio of SM requests to SM acknowledgments is one-to-one.

Broadcast Tele-services, as currently proposed for IS-136, will allow the wireless communication systems to transmit to every mobile-telephone within the coverage area of the wireless communication system, or part thereof, a broadcast short message (BSM) on a set of forward sub-channels referred herein as Broadcast Channels (BCCH). Similar to a short message, a broadcast short message can be one of two types: (1) an informative message, such as stock quotes, sports news, etc.; or (2) a request for each of the mobile-telephones to respond with an acknowledgment, such as a vote. If the broadcast short message is a request, the mobile-telephone can respond with a BSM acknowledgment on the RACH. Unlike SM requests, the ratio of BSM requests to BSM acknowledgments is one-to-many. Thus, if a large number of mobile-telephones are attempting to transmit BSM acknowledgments at the same time over the same RACH, collisions are likely to be caused among the acknowledging mobile-telephones (i.e., mobile-telephones attempting to send a BMS acknowledgment), and between the acknowledging mobile-telephones and mobile-telephones transmitting call processing related messages over the same RACH. In other words, the RACH may become congested as a result of numerous mobile-telephones attempting to transmit on the RACH at the same time. Such congestion prevents call processing related messages and BMS acknowledgments from being successfully received by the wireless communication system. Accordingly, there exists a need to control random access channel congestion that result from a large number of mobile-telephones transmitting acknowledgments to broadcast short message.

SUMMARY OF THE INVENTION

One embodiment of the present invention is a method for controlling random access channel congestion that result from a large number of mobile-telephones transmitting acknowledgments to broadcast short messages. In this embodiment, BSM acknowledgment transmissions on the random access channel are controlled by the wireless communication system using random access channel restrictions and random access techniques, Random access channel restrictions are used to reduce collisions among acknowledging mobile-telephones and call processing mobile-telephones by limiting the BSM acknowledgment transmissions to particular random access channels. Random access techniques are used to reduce collisions among acknowledging mobile-telephones by distributing the BSM acknowledgment transmissions over time.

In another embodiment of the present invention, the wireless communication system transmits a broadcast short message with a bit map and a time delay parameter. The bit map indicates which particular random access channels may be used for transmitting BSM acknowledgments. The time delay parameter is used by the mobile-telephone in conjunction with the output of a random number generator to determine the duration of a random delay period. Upon the end of the random delay period, each of the mobile-telephones will attempt to transmit an acknowledgment to the broadcast short message using the random access channels that were indicated in the bit map.

BRIEF DESCRIPTION OF THE DRAWINGS

The features, aspects, and advantages of the present invention will become better understood with regard to the following description, appended claims, and accompanying drawings where:

FIG. 4 depicts an example illustrating a manner of identifying a current reverse sub-channel.

DETAILED DESCRIPTION

Wireless communication systems and mobile-telephones communicate via a variety of communication channels, such as traffic channels, control channels, etc. The manner in which each communication channel is defined depends, in part, on the particular multiple access technique being employed by the wireless communication system. For example, if the wireless communication system employs a frequency division multiple access (FDMA) techniques, a communication channel is defined by a frequency channel. If direct sequence code division multiple access (DS-CDMA) techniques are employed, then a communication channel is defined by a frequency channel (or band) and a unique high bit rate code sequence that is essentially uncorrelated with that assigned to any other user. For purposes of discussion, one embodiment of the present invention will be described herein with respect to a time division multiple access (TDMA) wireless communication system based on the well-known IS-136 wireless communication standards. This should not be construed, however, to limit the present invention in any manner to TDMA wireless communication systems based on IS-136 wireless communication standards. The present invention is also applicable to wireless communication systems based on other TDMA standards and multiple access techniques.

Figure 1:
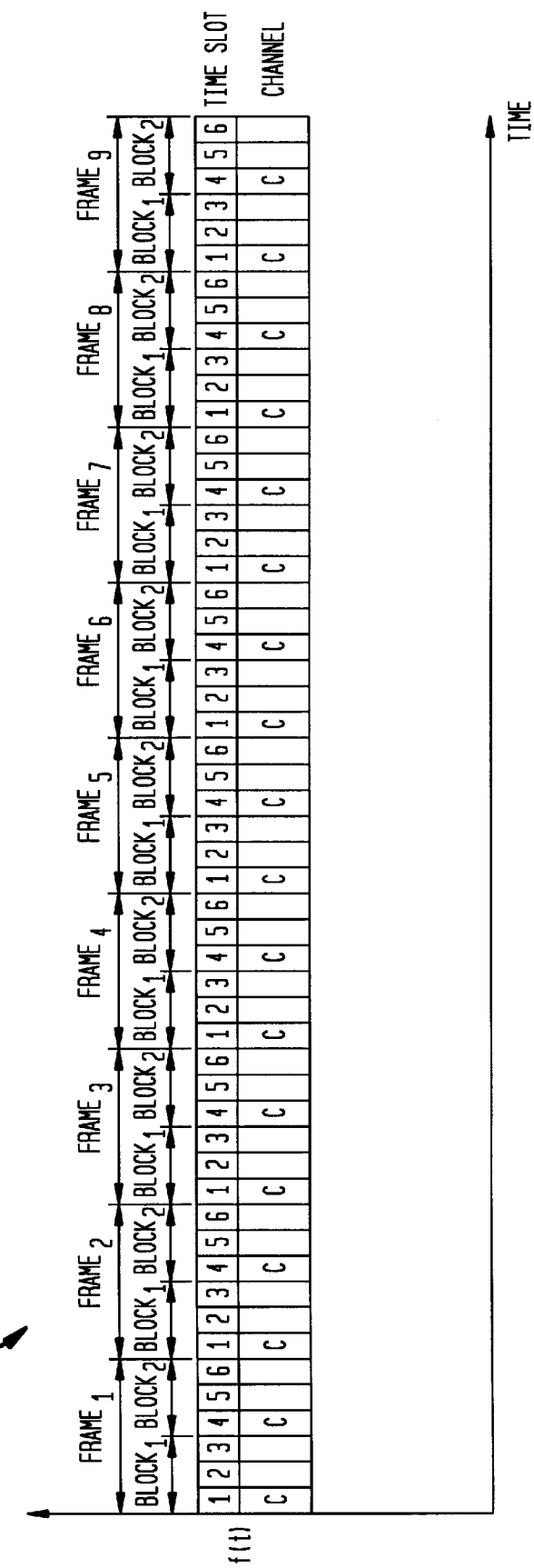
FIG. 1 depicts a sequence of time slots, blocks and frames in accordance with one embodiment of the present invention.

In wireless communication systems employing TDMA techniques based on IS-136, a communication channel is defined by a frequency channel and a time slot, i.e., an interval of time. FIG. 1 illustrates a sequence of time slots 10 along a frequency channel $f(t)$, wherein a set of three consecutive time slots (e.g., time slots 1, 2 and 3) constitutes a block, a set of two consecutive blocks (e.g., blocks 1 and 2) constitutes a frame, and a set of thirty-two frames constitute a hyper-frame. In one embodiment, signals are transmitted on the first time slots of each block—that is, only the first and fourth time slots of each frame are communication channels for signal transmission. Note that these time slots, i.e., first and fourth, are also referred to herein as sub-channels.

Figure 2:
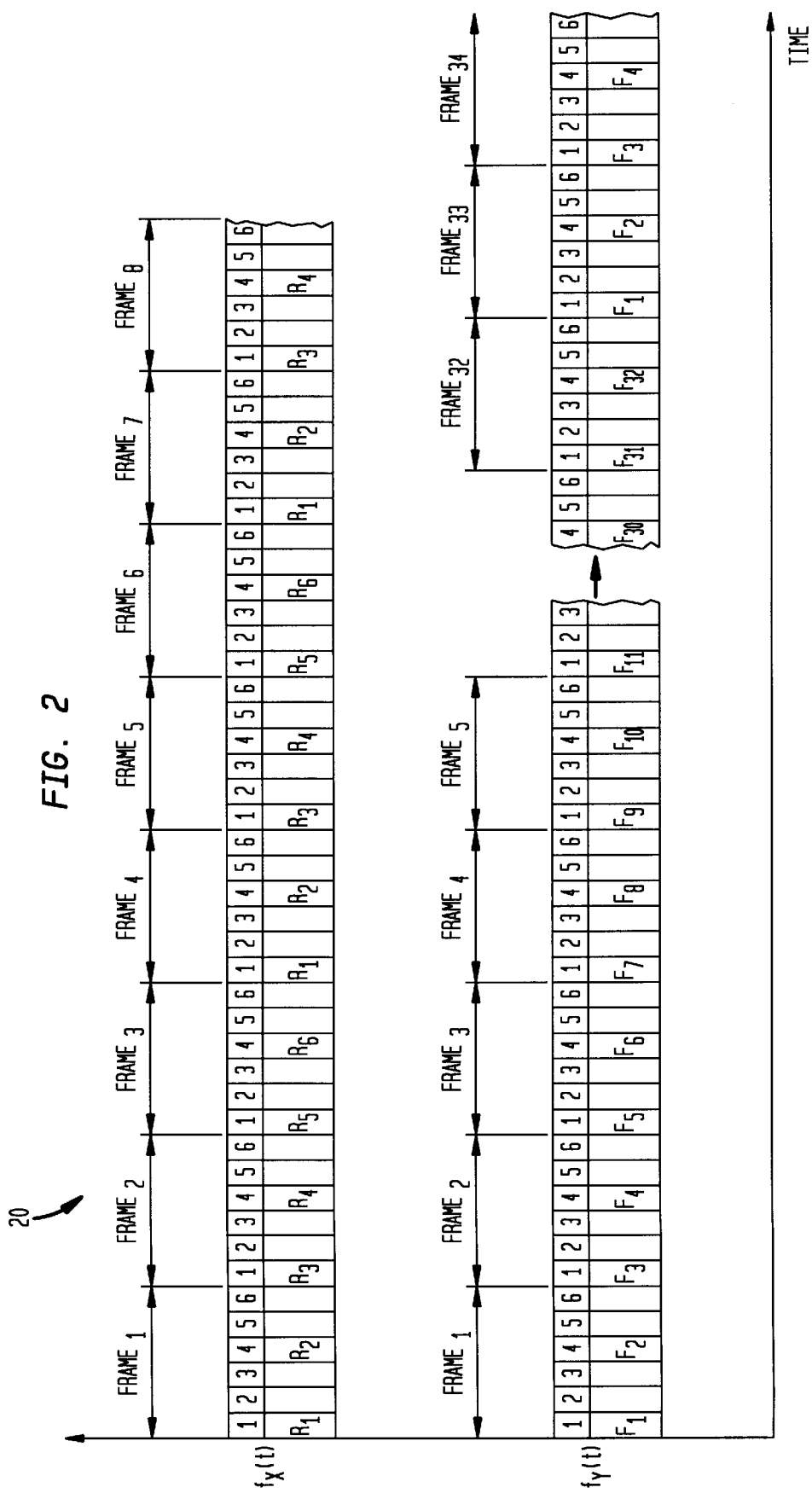
FIG. 2 depicts a set of reverse sub-channels and a set of forward sub-channels that collectively comprise control channels.

The broadcast short messages and the corresponding acknowledgments are transmitted on control channels, which are channels for transmitting control information and short messages between a wireless communication system and a mobile-telephone. In IS-136, the control channels are referred to as Digital Control Channels (DCCH). The DCCH include a frequency channel $f_x(t)$ for transmitting messages from the mobile-telephone to the wireless communication system, i.e., reverse channel, and a frequency channel $f_y(t)$ for transmitting messages from the wireless communication system to the mobile-telephone, i.e., forward channel. The reverse channel $f_x(t)$ includes $f_y(t)$ thirty-two forward sub-channels $F_j$ (where j=1, 2, . . . , 32). As shown in FIG. 2, the reverse sub-channels $R_i$ are the first time slots in each block of the reverse channel $f_x(t)$, and the forward sub-channels $F_j$ are the first time slots in each block of the forward channel $f_y(t)$. Specifically, the reverse sub-channels $R_i$ are the first time slots in a set of six consecutive blocks, e.g., time slots 1 and 4 in frames 1, 2 and 3. By comparison, the forward sub-channels $F_j$ are the first time slots in a set of thirty-two consecutive blocks, e.g., time slots 1 and 4 in frames 1–16. It should be noted that each reverse sub-channel $R_i$ repeats every three frames, and each forward sub-channel $F_j$ repeats every sixteen frames (or super-frame).

The six reverse sub-channels $R_i$ collectively comprise a set of sub-channels referred to as random access channels (RACH), which are typically used by mobile-telephones to transmit call processing related messages, such as those involving originating calls and responding to pages. By contrast, the forward sub-channels $F_j$ include the following groups of sub-channels: Short messaging service, Point-to-point, paging and Access response Channels (SPACH) for broadcasting messages to particular mobile-telephones regarding short messaging service point-to-point, paging and access response; Broadcast Channels (BCCH) for broadcasting generic system related messages or short messages to one or more groups of mobile-telephones; Shared Channel Feedback (SCF) for supporting RACH operation; and reserved channels for future use.

In IS-136, each transmission over a forward sub-channel $F_j$ includes a Busy-Reserved-Idle (BRI) flag specifying the current state of a reverse sub-channel $R_i$ (i.e., whether the reverse sub-channel is idle, busy or reserved) and an acknowledgment flag indicating whether a BSM acknowledgment was successfully received in a previous transmission over a reverse sub-channel $R_i$. In one embodiment, a BRI flag indicating the state of the reverse sub-channel $R_1$ is transmitted on the forward sub-channel $F_1$ and every sixth forward sub-channel thereafter, a BRI flag indicating the state of the reverse sub-channel $R_2$ is transmitted on the forward sub-channel $F_2$ and every sixth forward sub-channel thereafter, etc. For example, as shown back in FIG. 2, a BRI flag for reverse sub-channel $R_1$ (at frame 1, time slot 1 along reverse sub-channel $f_x(t)$) is transmitted over forward sub-channel $F_1$ (at frame 1, time slot 1 along reverse sub-channel $f_y(t)$), a BRI flag for reverse sub-channel $R_1$ (at frame 4, time slot 1 along reverse sub-channel $f_x(t)$) is transmitted over forward sub-channel $F_7$ (at frame 4, time slot 1 along reverse sub-channel $f_y(t)$), etc.

Likewise, an acknowledgment flag indicating successful receipt (by the wireless communication system) of a BSM acknowledgment in a previous transmission over the reverse sub-channel $R_1$ is transmitted on the forward sub-channel $F_1$ and every sixth forward sub-channel thereafter, an acknowledgment flag indicating successful receipt (by the wireless communication system) of a BSM message in a previous transmission over the reverse sub-channel $R_2$ is transmitted over the forward sub-channel $F_2$ and every sixth forward sub-channel thereafter, etc. For example, as shown back in FIG. 2, an acknowledgment flag for reverse sub-channel $R_1$ (at frame 1, time slot 1 along reverse sub-channel $f_x(t)$) is transmitted over forward sub-channel $F_7$(at frame 4, time slot 1 along reverse sub-channel $f_y(t)$), an acknowledgment flag for reverse sub-channel $R_1$ (at frame 4, time slot 1 along reverse sub-channel $f_x(t)$) is transmitted over forward sub-channel $F_{13}$ (at frame 7, time slot 1 along reverse sub-channel $f_y(t)$), etc.

Broadcast short messages are typically short messages (not longer than 255 characters in length) transmitted to one or more groups of mobile-telephones within the coverage area of the wireless communication system (or part thereof). Broadcast short messages may be transmitted on the BCCH, and can be one of two types: (1) informative messages, such as stock quotes, sports news, etc.; or (2) requests for one or more groups of the mobile-telephones to respond with an acknowledgment, such as a vote. If the broadcast short message is a request, the mobile-telephone can respond with a BSM acknowledgment over the RACH. One BSM request will typically solicit many BSM acknowledgments. If a large number of mobile-telephones attempt to acknowledge, i.e., transmit BSM acknowledgments, at the same time, two types of collisions are likely to occur. The first type of collision is among acknowledging mobile-telephones, i.e., mobile-telephones attempting to send a BMS acknowledgment. The second type of collision is between the acknowledging mobile-telephones and mobile-telephones transmitting call processing related messages (e.g., mobile-telephones originating calls, responding to pages, etc.). In other words, the RACH may become congested as a result of numerous mobile-telephones attempting to transmit on the RACH at the same time. Such congestion prevents call processing messages and BMS acknowledgments from being successfully received by the wireless communication system.

Figure 3:
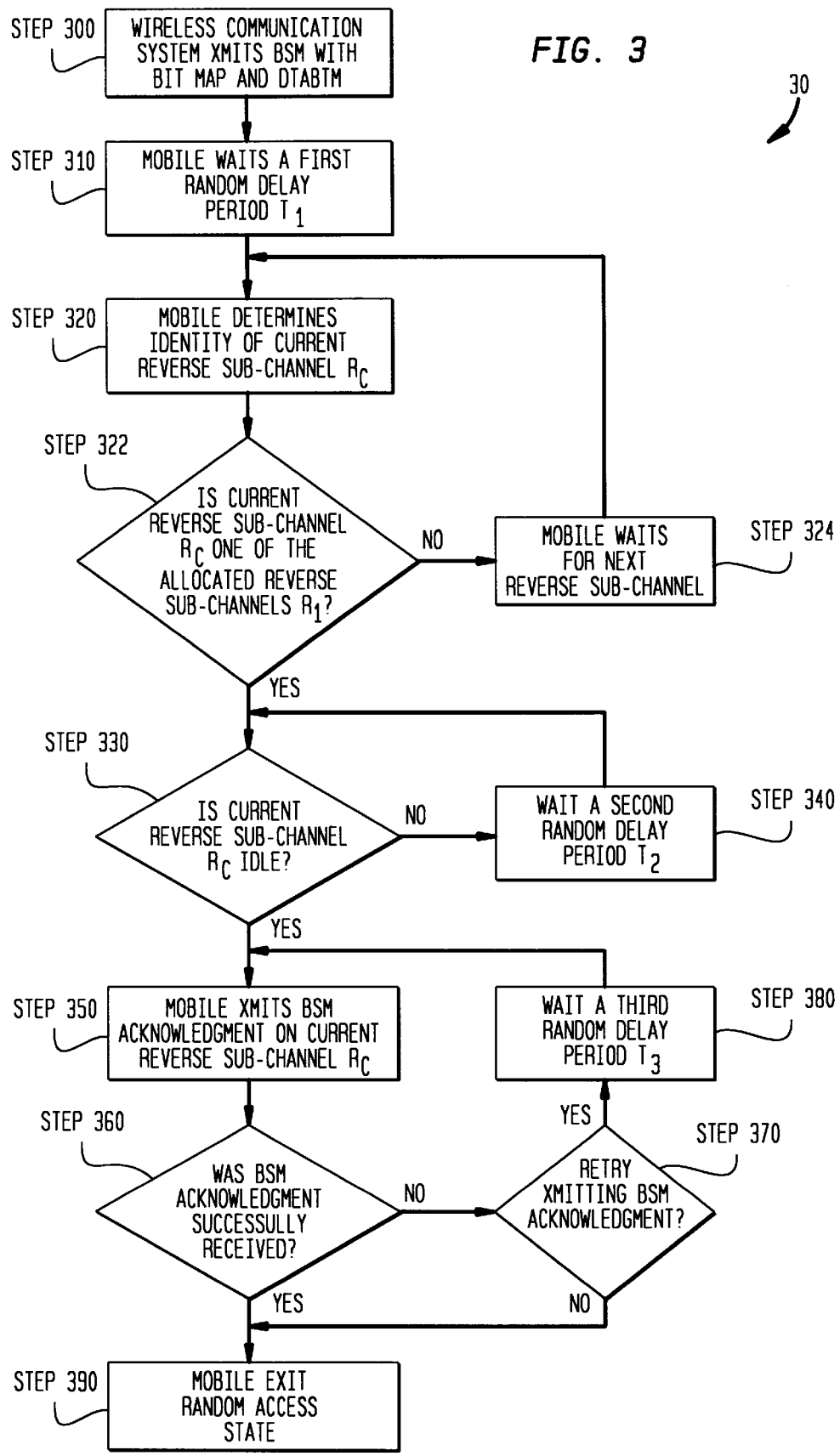
FIG. 3 depicts a flowchart illustrating one embodiment of the present invention for controlling random access channel congestion.

Collisions among acknowledging mobile-telephones and call processing mobile-telephones are reduced by limiting the acknowledging mobile-telephones to specific reverse sub-channels $R_i$. Collisions among acknowledging mobile-telephones are reduced by utilizing random access techniques. Referring to FIG. 3, a flowchart 30 illustrates one embodiment for controlling RACH congestion. In step 300, a wireless communication system transmits (via one or more base stations) to every mobile-telephone within its coverage area a broadcast short message with an allocation bit map and a Delay Time of Acknowledgment to Broadcast Teleservice Message (DTABTM). The allocation bit map indicates specific reverse sub-channels $R_i$ that the mobile-telephones can access for transmitting a BSM acknowledgment. In one embodiment, the allocation bit map is a bit map with six bits corresponding to the six reverse sub-channels $R_i$ that comprise the RACH. Each bit is a value indicating whether the corresponding reverse sub-channel $R_i$ is allocated or accessible to the acknowledging mobile-telephones. For example, an allocation bit map "101000" indicates that reverse sub-channels $R_1$ and $R_3$ can be used by the acknowledging mobile-telephones to transmit the BSM acknowledgment (and reverse subchannels $R_2$, $R_4$, $R_5$, $R_6$, can not be used by the acknowledging mobile-telephones). The number of reverse sub-channels $R_i$ allocated (for BSM acknowledgments) is determined by the volume of expected BSM acknowledgments and the control channel capacity of the wireless communication system. For example, if the volume of expected BSM acknowledgments is high and the wireless system has sufficient DCCH capacity, then more than one reverse sub-channel $R_i$ can be allocated for BSM acknowledgments.

The DTABTM is a time delay parameter, e.g., twenty minutes, which is multiplied by a random number generated by the mobile-telephone to determine a random delay period for the mobile-telephone to transmit a BSM acknowledgment. In one embodiment, the DTABTM parameter is set according to the urgency and the volume of the BSM acknowledgments. If the BSM acknowledgment is time critical and expected response volume is small, then the DTABTM parameter can be set to a small value. By contrast, if the BSM acknowledgment is not time critical and expected response volume is large, then the DTABTM parameter can be set to a large value.

In step 310, the mobile-telephone receives the broadcast short message request (with the allocation bit map and DTABTM) and waits a first random delay period $T_1$, where, in one embodiment, $T_1$ is the product of a random number (between zero and one) generated by the mobile-telephone and the DTABTM. Note that each mobile telephone generates its own random number, thus the first random delay period $T_1$ for most mobile-telephones should be different. Upon the end of the first random delay period $T_1$, the mobile-telephone enters a random access state during which the mobile-telephone attempts to transmit a BSM acknowledgment using the next idle allocated reverse sub-channel $R_i$ (indicated in the bit map). In step 320, the mobile-telephone determines the identity of the current reverse sub-channel $R_c$ and, in step 322, determines whether the current reverse sub-channel $R_c$ is one of the allocated reverse sub-channels $R_i$.

In one embodiment, the mobile-telephone determines the identity of the current reverse sub-channel $R_c$ using the following equation:

$$R_c=[(HFC*64+SCC) \bmod 6]+1 \qquad \text{equation (1)}$$

where HFC=0,1,2,3, . . . is the current hyper-frame count, and SCC=0,1,2, . . . , 63 is the sub-channel count in the current hylyer-frame. Note that the hyper-frame count and/or subchannel count are initialized by the wireless communication system. FIG. 4 shows an example 40 illustrating how the identity of the current reverse sub-channel can be determined using equation (1). In this example, suppose the hyper-frame count is 0 and the sub-channel count is 8. Using equation (1), current reverse sub-channel $R_c$ is determined to be $R_3$.

Upon determining the current reverse sub-channel $R_c$, in step 322, the mobile-telephone determines whether the current reverse sub-channel $R_c$ is one of the allocated reverse sub-channels $R_i$. If the current reverse sub-channel $R_c$ is not one of the allocated reverse sub-channels $R_i$, then the mobile-telephone, in step 324, waits a time interval equal to three time slots (or a block) before returning to step 320 (where the mobile-telephone determines the identity of the next current reverse sub-channel $R_c$). If the current reverse sub-channel $R_c$ is one of the allocated reverse sub-channels $R_i$, then the mobile-telephone proceeds to step 330 where the mobile-telephone checks to determine the state of the current reverse sub-channel $R_c$—that is, the mobile-telephone checks to determine whether the current reverse sub-channel $R_c$ is idle, i.e., not being used by another acknowledging or call processing mobile-telephone. In one embodiment, the mobile-telephone determines whether the current reverse sub-channel $R_c$ is idle by checking the BRI flag transmitted by the wireless communication system over the corresponding forward sub-channels $F_j$.

If the current reverse sub-channel $R_c$ is not idle, in step 340, the mobile-telephone waits a second random delay period $T_2$ before re-checking the state of the reverse sub-channel $R_c$ (i.e., return to step 330). In one embodiment, the second random delay period $T_2$ is a time interval between zero to eighteen blocks with a granularity of six blocks for full-rate DCCH. In other words, the mobile-telephone waits six, twelve or eighteen blocks before re-attempting to access the RACH (to transmit the BSM acknowledgment) using the reverse sub-channel $R_c$. Such an embodiment ensures that the current sub-channel $R_c$ at the end of the second random delay period $T_2$ is the same allocated reverse sub-channels $R_i$ (as at the beginning of the second random delay period $T_2$), thereby eliminating the nee& for the mobile-telephone to repeat steps 320, 322 and 324.

If the reverse sub-channel $R_c$ is idle, in step 350, the mobile-telephone transmits its BSM acknowledgments over the current reverse sub-channel $R_c$. In step 360, the mobile-telephone checks to determine whether the transmitted BSM acknowledgment was successfully received by the wireless communication system. In one embodiment, the mobile-telephone checks the acknowledgment flag in the next forward sub-channel $F_j$ (corresponding to the reverse sub-channel $R_c$ over which the BSM acknowledgment was transmitted) to determine whether the BSM acknowledgment was successfully received by the wireless communication system. If the BSM acknowledgment was successfully received by the wireless communication system, then the mobile-telephone exits the random access state, in step 390.

If the BSM acknowledgment was not successfully received by the wireless communication system, then the mobile-telephone determines whether to re-try sending the BSM acknowledgment, in step 370. In one embodiment, in step 370, the mobile-telephone checks to determine whether they have equal or exceeded a maximum number of allowable re-tries, i.e., attempts to successfully transmit the BSM acknowledgment. If yes, then the mobile-telephone waits a third random delay period $T_3$, in step 380, before re-checking the state of the selected reverse sub-channel $R_c$ (i.e., return to step 330). In one embodiment, the third random delay period $T_3$ is a time interval between zero to thirty blocks with a granularity of six blocks for full-rate DCCH. In other words, the mobile-telephone waits six, twelve, eighteen, twenty-four or thirty blocks before re-attempting to access the RACH (to transmit the BSM acknowledgment). If no, then the mobile-telephone exits the random access state without re-attempting to transmit the BSM acknowledgment.

Although the present invention has been described in considerable detail with reference to certain embodiments, other versions are possible. Therefore, the spirit and scope of the present invention should not be limited to the description of the embodiments contained herein.

We claim:

1. A method for controlling transmissions on channels in a wireless communication system comprising the steps of:

receiving a bit map at a mobile-telephone indicating a channel allocation, wherein the bit map includes six bit values for indicating whether a corresponding random access channel is allocated for transmission of the message by the mobile-telephone; and transmitting a message from the mobile-telephone using the allocated channel indicated in the bit map.

2. A method for controlling transmissions on channels in a wireless communication system comprising the steps of:

receiving at a mobile-telephone a first message and a time delay parameter;

generating a random number; and transmitting a second message in response to the first message after completion of a period defined using the time delay parameter and the random number.

3. The method of claim 2, wherein the period is equal to a product of the time delay parameter and the random number.

4. The method of claim 2 comprising the additional step of:

receiving at the mobile-telephone a third message indicating a channel allocation.

5. The method of claim 4, wherein the second message is transmitted over the allocated channel.

6. The method of claim 2, wherein the first message includes the time delay parameter.

7. The method of claim 2, wherein the time delay parameter is included in a third message.

8. The method of claim 2, wherein the first message includes a broadcast short message.

9. The method of claim 2, wherein the second message includes an acknowledgment to the first message.

10. A method for controlling transmissions on random access channels in a wireless communication system comprising the steps of:

receiving at a mobile-telephone a random access channel allocation and a time delay parameter;

waiting a period defined using the time delay parameter and a random number;

determining whether a current random access channel is the allocated random access channel;

repeating the step of determining whether the current random access channel is the allocated random access channel for the next current random access channel if the current random access channel is not the allocated random access channel; and transmitting a message from the mobile-telephone using the current random access channel if the current random access channel is the allocated random access channel.

11. The method of claim 10 comprising the additional step of:

repeating the step of transmitting the message if the transmitted message was not successfully received by the wireless communication system.

12. A method for controlling transmissions on control channels in a wireless communication system comprising the steps of;

transmitting from a wireless communication system a first message indicating a control channel allocation; and receiving a second message at the wireless communication system over the allocated control channel.

13. The method of claim 12, wherein the first message further indicates a time delay parameter.

14. The method of claim 13, wherein the second message is received after a period defined using the time delay parameter and a random number.

15. A method for controlling transmissions on channels in a wireless communication system comprising the steps of:

transmitting from a wireless communication system a first message and a time delay parameter; and receiving at the wireless communication system a second message in response to the first message after completion of a period defined using the time delay parameter, wherein the period is equal to a product of the time delay parameter and a random number.

* * * * *